2,777,792

PEST COMBATING AGENTS

Karl Lutz and Otto Jucker, Basel, Switzerland, assignors to Sandoz A. G., Basel, Switzerland, a Swiss firm No Drawing. Application September 1, 1955, Serial No. 532,108

Claims priority, application Switzerland September 1, 1954

11 Claims. (Cl. 167—22)

The present invention relates to pest control agents. According to this invention, compositions are provided which are suitable for combating pests, especially insects, and which comprise on the one hand at least one thionophosphoric acid ester corresponding to the formula

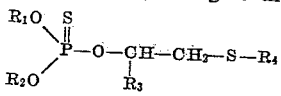

wherein each of $R_1$, $R_2$ and $R_4$ is a low-molecular aliphatic hydrocarbon radical, and $R_3$ is a lower alkoxymethyl group, and on the other hand at least one compound which facilitates distribution of the thionophosphoric acid ester.

The thionophosphoric acid esters of the above formula are new compounds which are advantageously prepared by the reaction between compounds of the formula

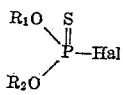

and compounds of the formula

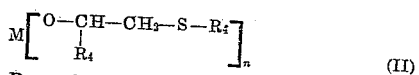

wherein $R_1$, $R_2$, $R_3$ and $R_4$ have the afore-recited significances, M is a cation which may be hydrogen, and $n$ is 1, 2 or 3.

The compound of Formula I is reacted with the compound of Formula II in the presence of an acid-binding agent such for example as sodium carbonate, sodium acetate, sodium cyanide and the like, and advantageously in a solvent such as toluene, xylene, acetone and the like. A preferred procedure consists in reacting a compound of Formula I with an alkali metal alcoholate of a compound of Formula II, the solvent employed being preferably toluene or xylene. The condensations are advantageously carried out in the range from 50° to 150° C.

The so-obtained compounds are at ordinary temperature (about 20° to 30° C.) mostly clear oils which, in many cases, can be distilled without decomposition. They are stable in aqueous suspension and are soluble in oils as well as in organic solvents.

The said compounds have outstanding insecticidal and systemic action.

It is known that compounds of the formula

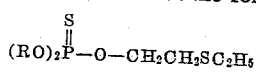

properly employed, have a good insecticidal action and more especially a good inner-therapeutic action. Surprisingly and unexpectedly, the introduction of the $R_3$ radical—as hereinbefore defined—not only increases the systemic inter-therapeutic action of the corresponding compounds but also decidedly reduces the toxicity thereof to warm-blooded animals. In addition, the $R_3$-substituted compounds are distinguished from the unsubstituted compounds by an essentially reduced odor.

The following examples set forth exemplary embodiments of the invention. In these examples, parts by weight bear the same relationship to parts by volume as do grams to milliliters; temperatures are in degrees centigrade.

Example 1

18.4 parts by weight of sodium are finely pulverized in boiling xylene and, after cooling, 120 parts by weight of ethyl-(3-methoxy-2-hydroxy-propyl)-sulfide are added dropwise at 25–30°. Upon completion of the reaction, 128 parts by weight of dimethyl-thiophosphoric acid chloride are added all at once, and the mixture is stirred for 3 hours at 100–110°. After cooling to 30°, the reaction mixture is washed with three portions of water of 150 parts by volume each. After removal of the solvent under reduced pressure, there is obtained a weakly colored, substantially odorless oil which consists primarily of the compound of the formula

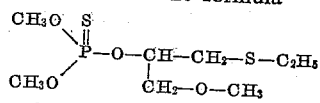

and which has the following properties:

boiling point = 128–132°/0.5 mm.; $n_D^{20} = 1.4945$

Example 2

81 parts by weight of pyridine are added dropwise at 30–40° to a mixture of 160 parts by weight of dimethyl-thiophosphoric acid chloride and 150 parts by weight of ethyl-(3-methoxy-2-hydroxy-propyl)-sulfide. The mixture is then stirred for two more hours at 45°, then cooled, 250 parts by volume of benzol added, and the whole shaken 3 times, each time with 150 parts by volume of water. The benzolic solution is dried over calcium chloride and the solvent removed by distillation under reduced pressure. The active material obtained by high vacuum distillation from the residue is identical with that obtained according to Example 1.

Example 3

160 parts by weight of potash (potassium carbonate), 5 parts by weight of copper powder, 150 parts by weight of ethyl-(3-methoxy-2-hydroxy-propyl)-sulfide and 200 parts by volume of benzol (benzene) are thoroughly admixed. At an internal temperature of 70°, 161 parts by weight of dimethyl-thiophosphoric acid chloride are added dropwise in the course of 30 minutes and while stirring thoroughly. Thereupon the mixture is stirred for 6 more hours at 75°. The resultant salts are separated, the filtrate washed 3 times, each time with 100 parts by volume of water, and dried. After removal of the solvent and the readily-volatile constituents under reduced pressure, an oil remains which, after high vacuum distillation, is identical with that obtained according to Example 1.

Example 4

4.6 parts by weight of sodium are pulverized in 100 parts by volume of xylene, and then 33 parts by weight of ethyl-(3-ethoxy-2-hydroxy-propyl)-sulfide are added. When the sodium has completely dissolved, 38 parts by weight of dimethyl-thiophosphoric acid chloride are added, and the procedure according to Example 1 then followed. The obtained weakly colored oil consists essentially of a compound of the formula

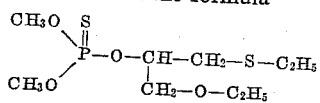

which has the following characteristics: boiling point = 108–112°/0.1 mm.; $n_D^{20} = 1.4901$.

Example 5

18.4 parts by weight of sodium are pulverized in 300 parts by volume of xylene and reacted with 120 parts by weight of ethyl-(3-methoxy-2-hydroxy-propyl)-sulfide at 25–30°. To the homogeneous solution, 152 parts by weight of diethyl-thiophosphoric acid chloride are added, and the reaction carried out and product worked up by distillation after the manner described in Example 1. There is obtained a compound of the formula

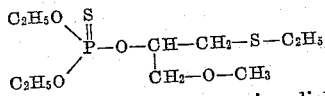

which possesses the following properties: light yellow oil with a boiling point of 121–127°/0.3 mm.; $n_D^{20}=1.4861$.

Example 6

4.6 parts by weight of sodium are pulverized in 150 parts by volume of xylene and reacted with 33 parts by weight of ethyl-(3-ethoxy-2-hydroxy-propyl)-sulfide at 25–30°. 38 parts by weight of diethyl-thiophosphoric acid chloride are added to the reaction mixture and the reaction and the working up by distillation carried out after the manner set forth in Example 1. There is obtained a compound of the formula

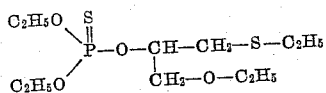

as a light-yellow oil with a boiling point of 130–132°/0.3 mm.; $n_D^{20}=1.4858$.

Example 7

The earth of a potted spiderwort (Tradescantia) plant is wetted with 100 cc. of a solution which in addition to 0.02% by weight of p-isooctylphenyloctaglycolether as emulsifying agent also contains 0.02% by weight of the ester described in Example 5. At the end of 4 days, the plant is infested with Carausius larvae in the second-last larva stage. Within 6 days after infestation, 96% of the larvae are dead.

Example 8

The procedure according to Fig. 7 is repeated, but replacing the compound according to Example 5 with that according to Example 1. Within 6 days after infestation 86% of the larvae are dead.

Example 9

The lower side of cotoneaster branches are sprayed with an aqueous emulsion which in addition to 0.1% by weight of a diisooctylphenylheptaglycolether also contains 0.1% by weight of the compound of the formula

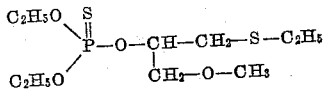

while the upper aphis-infested side remains untreated. After 42 hours, practically no honey-dew secretion can be observed, indicating complete destruction of the aphis.

Example 10

A strip of gauze is impregnated by immersion in an aqueous emulsion which contains 0.01% by weight of a diisooctylphenylheptaglycolether and 0.01% by weight of the compound of the formula

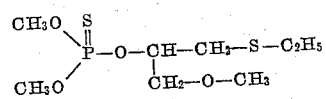

and is then wound around an aphis-infected Heracleum plant and then covered with a polyethylene sheet to protect it against evaporation. After 42 hours, practically no honey-dew secretion can be observed.

Example 11

Aphis-infected cotoneaster plants are sprayed with an aqueous solution of the same composition as in Example 1. After 20 hours, the entire aphis population is dead.

Example 12

20 parts by weight of the ester described in Example 1 are admixed with 20 parts by weight of diisooctylphenyl-heptaglycolether, a clear solution being obtained. An aqueous emulsion of this solution, which contains 0.05% by weight of the ester, is sprayed onto aphis-infected young apple trees. The aphis are dead in a few hours.

Example 13

50 parts by weight of the ester described in Example 4 are admixed with 40 parts by weight of laurylhexaglycol-ether and 10 parts by weight of toluene. A clear solution is obtained. A 0.1% by weight aqueous emulsion of this solution is sprayed onto aphis-infected asters. The aphis are dead in a few hours.

Example 14

By admixing 20 parts by weight of the ester described in Example 5 with 20 parts by weight of octylphenyl-polyglycolether and 60 parts by weight of butylpoly-glycol, a product is obtained of very good emulsifiability in water. An aqueous emulsion of this product, which contains 0.05% by weight of the said ester, kills aphis in a short time.

Example 15

2 parts by weight of the ester described in Example 1 are admixed with 98 parts by weight of talc, and the mixture is ground in a ball-mill. A dusting agent is obtained which is spread out in a thin layer on Petri dishes. Periplaneta (cockroaches) placed in these dishes are dead in 24 hours.

Example 16

20 parts by weight of the ester described in Example 5 with 20 parts by weight of an oleylpolyglycolether containing 20 ethenoxy groups and 60 parts by weight of glycolmonoethylether are admixed, giving a clear solution of good emulsifiability in water. An aqueous emulsion of this solution, which contains 0.05% by weight of the ester, kills aphis in a few hours.

Example 17

30 parts by weight of the ester described in Example 6 are admixed with 30 parts by weight of octylphenylpoly-glycolether and 40 parts by weight of butylpolyglycol, a clear solution being obtained. An aqueous emulsion of this solution, which contains 0.05% by weight of the ester, kills aphis in a few hours.

Example 18

A pulverulent agent of good suspendability in water is obtained when 5 parts by weight of the ester described in Example 1 are thoroughly admixed with 5 parts by weight of nonylphenyloctaglycolether and the resultant clear solution is thoroughly admixed with 10 parts by weight of colloidal silica, 40 parts by weight of urea and 40 parts by weight of Glauber's salt. A loose dry powder is obtained which dissolves rapidly in water. An aqueous solution prepared from this powder and containing 0.05% by weight of the said ester kills aphis onto which it is sprayed, in several hours.

Example 19

By admixing 20 parts by weight of the ester described in Example 5 with 20 parts by weight of nonylphenyl-decaglycolether, 50 parts by weight of diethylene glycol and 10 parts by weight of butylpolyglycol, a clear solution is obtained. An aqueous emulsion of this solution, which contains 0.05% by weight of the ester, kills aphis in a few hours.

Example 20

8 parts by weight of the ester described in Example 5 are admixed with 18 parts by weight of oleylpolyglycolether, 67 parts by weight of paraffin oil and 7 parts by weight of octyl alcohol, a clear solution being obtained. An aqueous 1% by weight emulsion of this solution is sprayed onto fruit trees prior to bud formation, and effectively gets rid of those stages of aphis and spider mites which have survived the winter.

Having thus disclosed the invention, what is claimed is:

1. A thionophosphoric acid ester which corresponds to the formula

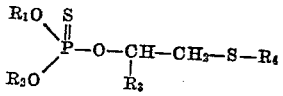

wherein each of $R_1$, $R_2$ and $R_4$ represents a lower alkyl group and $R_3$ represents a lower alkoxymethyl group.

2. The thionophosphoric acid ester of the formula

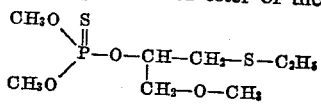

3. The thionophosphoric acid ester of the formula

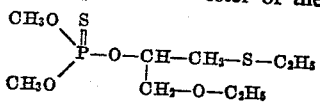

4. The thionophosphoric acid ester of the formula

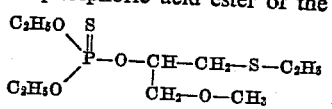

5. The thionophosphoric acid ester of the formula

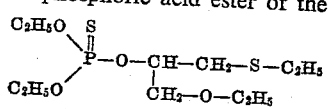

6. A pest controlling composition consisting essentially of a thionophosphoric acid ester which corresponds to the formula

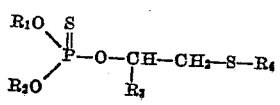

wherein each of $R_1$, $R_2$ and $R_4$ represents a lower alkyl group and $R_3$ represents a lower alkoxymethyl group, and a pesticide carrier therefor.

7. A pest controlling composition consisting essentially of the thionophosphoric acid ester of the formula

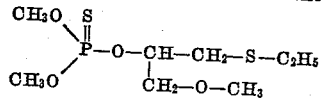

and a pesticide carrier therefor.

8. A pest controlling composition consisting essentially of the thionophosphoric acid ester of the formula

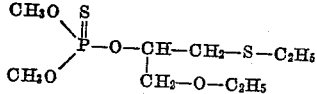

and a pesticide carrier therefor.

9. A pest controlling composition consisting essentially of the thionophosphoric acid ester of the formula

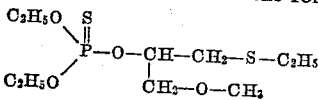

and a pesticide carrier therefor.

10. A pest controlling composition consisting essentially of the thionophosphoric acid ester of the formula

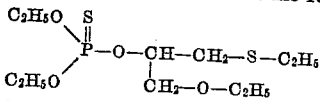

and a pesticide carrier therefor.

11. A method of combatting insect pests which comprises exposing them to the action of a pest controlling composition consisting essentially of a thionophosphoric acid ester which corresponds to the formula

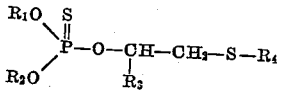

wherein each of $R_1$, $R_2$ and $R_4$ represents a lower alkyl group and $R_3$ represents a lower alkoxymethyl group, and a pesticide carrier therefor.

No references cited.